Oct. 11, 1960 L. L. JASKEY 2,955,834
GOLF CART
Filed Oct. 27, 1958 2 Sheets-Sheet 1
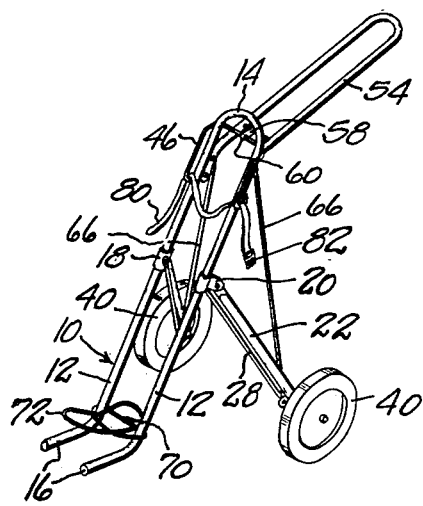
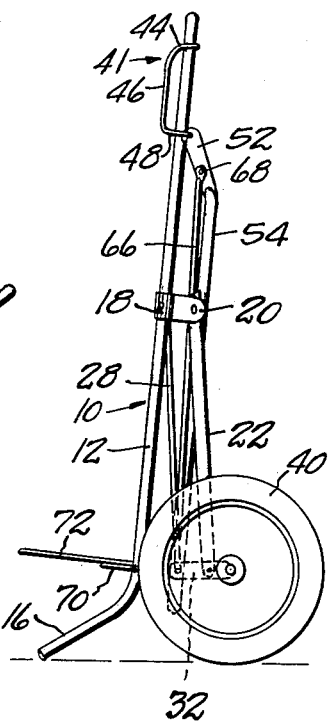
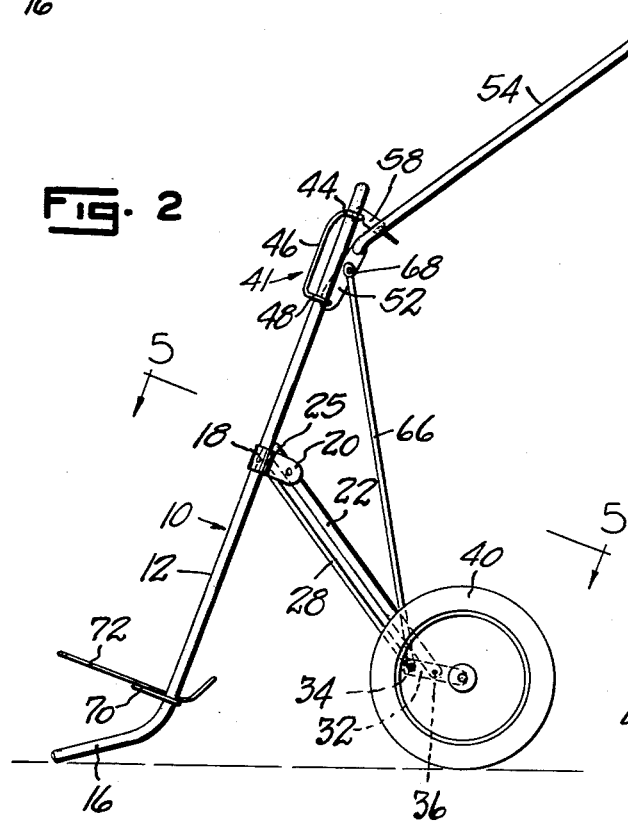
LEO L. JASKEY
INVENTOR.
BY Eugene C. Knoblock
ATTORNEY

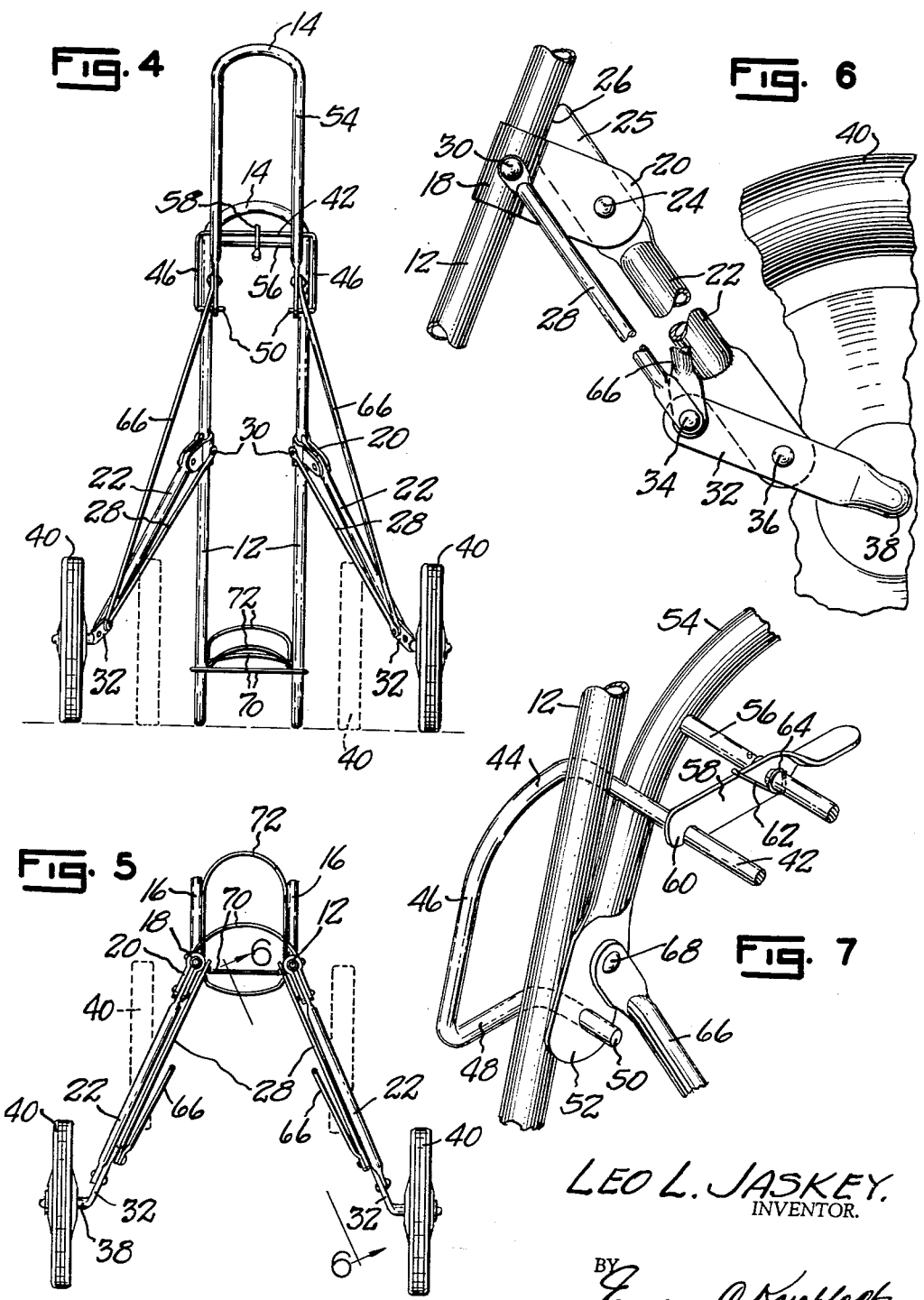

United States Patent Office 2,955,834
Patented Oct. 11, 1960

2,955,834
GOLF CART
Leo Louis Jaskey, 934 Sancome Ave., South Bend, Ind.
Filed Oct. 27, 1958, Ser. No. 769,614
7 Claims. (Cl. 280—42)

This invention relates to improvements in golf carts, and more particularly to a collapsible golf cart.

The primary object of this invention is to provide a novel, strong, simple golf cart which collapses to small size so as to require minimum space for storage and in which the parts are effectively braced and positioned when extended for use.

A further object is to provide a golf cart with a novel, strudy, inexpensive frame having a pair of juxtaposed upright runs wherein a wheel-mounting structure is carried in collapsible manner upon each of said runs and a novel mechanism is provided for extending and collapsing said wheel-mounting structures in a path between a wide wheel spread position in use and a retracted position with the wheels alongside said frame when collapsed.

A further object is to provide a device of this character having a novel frame carrying a novel structural unit shaped and arranged to serve multiple purposes including anchorage of a retainer strap, pivoting of a handle unit, and retaining a lock which positions the handle.

A further object is to provide a device of this character having a substantially U-shaped tubular metal frame, to each run of which is anchored a bracket extending diagonally from a plane of said U-shaped member and providing anchorage for links cooperating therewith and with a wheel-mounting bracket to define a parallelogram support for a wheel guiding its movement from angularly displaced outwardly spread operative position and a collapsed position juxtaposed to and alongside the frame.

Other objects will be apparent from the following specification.

In the drawings:

Fig. 1 is a perspective view of the golf cart in erected or use position;

Fig. 2 is a view of the golf cart in erected or use position shown in side elevation;

Fig. 3 is a side elevational view illustrating the golf cart in collapsed position;

Fig. 4 is a rear elevational view of the golf cart in erected position and illustrating in dotted lines the spacing of the wheels when the cart is collapsed;

Fig. 5 is a top plan view of the golf cart in erected or extended position with the handle removed, and illustrating in dotted lines the position of the wheels when collapsed;

Fig. 6 is an enlarged fragmentary detail sectional view taken on line 6—6 of Fig. 5; and Fig. 7 is a fragmentary detail perspective view illustrating the handle mount and latch.

Referring to the drawings which illustrate the preferred embodiment of the invention, the numeral 10 designates the frame of the device which preferably is formed of tubular metal stock bent substantially to U-shape to previde a pair of substantially parallel frame runs 12 interconnected by a curved bent or bight portion 14 and provided at the opposite or free ends thereof with angularly bent terminal or foot portions 16 extending in a common plane and of equal length.

Intermediate the length of the runs or legs 12 of the frame are mounted bracket members which include a bent intermediate portion 18 extending around the leg 12 and a pair of spaced substantially parallel ears 20. The brackets project from the legs 12 in diverging relation to each other and at an angle to the plane common to the frame legs 12. As best seen in Fig. 5, the angular projection of the flanges 20 will be such that they each extend at an angle of approximately 60 degrees from each other and from the plane common to the legs 12.

A strut 22 is pivoted to each bracket flange 20 at 24 adjacent the free ends of the flanges 20 and spaced from the adjacent leg 12. The strut 22 is preferably formed of tubular metal and one end portion 25 thereof is preferably flattened to fit between the bracket flanges 20, and the end edge 26 thereof is preferably beveled to bear flat against the adjacent leg 12 in the extended position of the wheel, as best illustrated in Figs. 2 and 6. A rigid link 28 is pivotally connected at one end to a leg 12 by means of a rivet 30 which serves also as the means to anchor and position the bracket 18, 20 upon the leg.

A wheel bracket 32 has a pivotal connection at 34 adjacent its free end with the link 28 and has a piovtal connection at 36 with the strut 22. The spacing between the pivots 34 and 36 will preferably be equal to the spacing between the pivots 24 and 30 upon the brackets 18, 20, and the spacing between the pivots 30 and 34 associated with the link 28 will be equal to the spacing of the pivots 24 and 36 associated with the strut 22, so that the parts comprising the bracket 18, 20, the strut 22, the link 28 and the wheel bracket 32 constitute a parallelogram. The wheel bracket 32 includes an axle portion 38 bent therefrom in an outward direction with its axis substantially parallel to the plane common to the frame leg portions 12 and substantially aligned with the axis of the other axle portion 38. A wheel 40 is mounted upon each axle for free rotation.

A substantially C-shaped member 41, which may be formed of rigid metal wire stock, is welded or otherwise suitably secured to the legs 12 of the frame adjacent the frame bight portion 14. This member includes an upper cross-part 42 connecting the opposed legs 12 and bent around each to provide a forwardly projecting run 44 which merges with a run 46 extending spaced forwardly from and substantially parallel to the adjacent leg 12, and this in turn merges with a rearward run 48 which is bent around the leg 12 and welded or otherwise anchored thereto at a point spaced below the upper weld connection with said frame leg, and each end of said member terminates in a part 50 substantially aligned with a similar end part carried by the opposite frame leg.

The terminal parts 50 form pivot pins to which are pivoted the flat ends 52 of an elongated U-shaped handle member 54 of suitable length. The handle 54 is reinforced by the crossbar 56 interconnecting the opposite sides thereof. A latch bar 58 is pivoted on the crossbar 56 and has a hooked end part 60 engageable with the member 42. A spring 62 has a U-shaped mid-portion extending across the latch bar 58 spaced from the crossbar 56 and has end portions 64 bent around the crossbar 56 and fixedly anchored thereto. The arrangement of the parts is such that when the handle 54 is in extended position bearing against the member 42, the latch 58 is urged by the spring 62 into engagement with the member 42 to lock the handle against pivotal movement of the members 50. Pivoting of the latch bar 58 upon the crossbar 56 against the action of the spring 62 releases the latch hook 60 from the member 42, whereupon the handle 54 may be swung from the extended position shown in Figs. 1 and 2 to a position alongside and substantially parallel to the frame legs 12, as seen in Fig. 3.

A pair of elongated brace members 66 are provided in the device. Each thereof is pivoted at 68 at its upper end to one of the end portions 52 of the handle 54 spaced from the handle pivot 50. The opposite or lower end of each brace 66 is pivoted to the wheel bracket 32 by pivot member 34.

Any suitable means may be provided to brace and connect the lower free ends of the frame 12 and to provide a support for the golf bag or other article to be carried thereby. As here illustrated, a loop 70 preferably formed of wire and extending in a plane substantially perpendicular to the legs 12 interconnects those legs spaced above foot portions 16 thereof. A second and larger loop 72, also preferably formed of wire, bears upon the loop 70 and may be welded or otherwise anchored thereto and, if desired, to the legs 12 between which it extends, so as to provide a firm support for the bottom of a golf bag.

In the erected position of the device, the handle 54 extends in upwardly rearwardly inclined relation to the upper end of the legs 12 of the frame, and the wheel-mounting struts 22 extend angularly downwardly and outwardly from the frame parts 12 to position the wheels 40 in rearwardly spaced relation to the frame and in a spread relation to each other, as best seen in Figs. 1, 4 and 5. The braces 66 determine the angular position of the struts 22 while the parallelogram relation of the parts 20, 22, 28 and 32 and the position of the bracket 20 cooperates with the bracing function of the brace 66, handle 54 and latch 58 to firmly support each wheel mount in the extended position. The latch 58 holds the parts together firmly, and it will be observed that in the preferred construction the handle 54 abuts the cross-member 42 when the latch hook 60 engages the member 42, and that simultaneously the edges 26 of the portions 25 of the struts 22 abut the adjacent legs 12. This relation of the parts insures that the structure is firm and solid in its extended or use position and is capable of serving its intended purpose and of traveling over rough terrain without injury thereto.

When the device is to be collapsed, the latch 58 is disengaged from the member 42 and this permits the handle 54 to be swung down to the position shown in Fig. 3 about the pivots 50. The downward movement of the handle pushes the cross-braces 66 endwise and downwardly to pivot the struts 44 downwardly and inwardly toward positions substantially parallel with the frame members 12, as illustrated in Fig. 3. This serves to arrange the parts compactly fore and aft so as to reduce fore and aft space required for storage. At the same time the struts 22 carry the wheels 40 inwardly toward each other and toward the frame to the position shown in dotted lines in Figs. 4 and 5, thus reducing the width required for the structure. Consequently, the unit reduces to a very compact size when collapsed.

The member consisting of the parts 42, 44, 46, 48 and 50 serves three purposes. The first of these purposes is to function as a retainer or keeper engageable by the latch member 58. The second of these purposes is the functioning of the end portions 50 as pivots for the handle 54. The third purpose is the provision of the loop forming forwardly projecting portions 44, 46 and 48 to serve as means to position the upper end of a golf bag supported by parts 70, 72 of the device and also to serve as supports carrying suitable strap means 80 for embracing a golf bag (not shown) and fastening the same to the device as by connection of a buckle 82 at one end thereof with the opposite free end of said strap, in the manner well understood in the art.

One of the important characteristics of the device is the U-shaped frame which provides great strength for the device with minimum weight and minimum expense. This arrangement permits separate simple inexpensive brackets to serve as the means to connect the struts 22 and the links 28 to the frame. Another important characteristic of the device is that strength has not been sacrificed by the structure but the weight of the parts has been held at a minimum so as to render the total weight of the cart and golf bag carried thereby well within the limits which may be handled by a golfer for the purpose of placing the assembly within the trunk of an automobile or within a storage cabinet and removing the same therefrom. At the same time this reduction in weight has been accomplished without requiring the use of expensive or special materials and, instead, has been accomplished by the use of inexpensive standard items, such as metal tubing, rigid wire or rod stock, and simple sheet metal brackets and latch member.

While the preferred embodiment of the invention has been described and illustrated, it will be understood that changes in the construction may be made within the scope of the appended claims without departing from the spirit of the invention.

I claim:

1. A golf cart comprising a frame having a pair of laterally spaced parts, a bracket secured to each part intermediate the length thereof and extending in diverging relation from said frame, a pair of rigid elongated members pivoted at spaced points to each bracket, a wheel bracket pivoted at spaced points to said elongated members and cooperating with said elongated members and bracket to define a parallelogram, a wheel journaled on each bracket, a handle pivoted to said frame, a pair of rigid links each pivotally connected at one end to said handle pivot and pivotally connected to one of said parallelograms adjacent to a wheel at its opposite end, and latch means for locking said handle in extended relation to said frame.

2. A golf cart as defined in claim 1, wherein said frame constitutes a metal tube of substantially U-shaped form whose legs constitute said spaced frame parts and said handle is also a U-shaped metal tube whose legs are pivoted to said frame legs.

3. A golf cart as defined in claim 1, wherein each link is pivoted to a parallelogram at a pivot connection between said wheel bracket and one of said elongated members.

4. A golf cart as defined in claim 1, wherein each of said handle and said frame constitutes a substantially U-shaped metal tube, and a C-shaped member connecting the opposite sides of said frame and including a transverse member and aligned inwardly projecting end parts pivotally mounting the ends of said handle, said latch being carried by said handle and interlocking with said transverse member.

5. A golf cart comprising a frame having a pair of laterally spaced parts, a pivoted parallelogram unit carried by each frame part, each unit including a part fixedly carried by said frame in selected angular relation thereto and to the similar part of the other unit and a part opposite said fixed part which constitutes a wheel-mounting member, a wheel journaled on each wheel-mounting member, a handle pivoted to said frame spaced above said units, a pair of links each pivoted to an intermediate part of said handle and to the wheel-mounting end of a parallelogram unit, and latch means for releasably holding said handle extended.

6. A golf cart as defined in claim 5, wherein said unit includes a strut pivoted to said fixed parallelogram part spaced from said frame, said strut including a part spaced from its said pivot to said fixed parallelogram part and abutting said frame when said handle is held extended by said latch.

7. A golf cart as defined in claim 5, wherein said frame includes a cross-member spanning said spaced parts and spaced from the pivot-mounting of said handle and abutted by said handle when said latch holds said handle extended said latch being pivoted to said handle and releasably engaging said cross member.

References Cited in the file of this patent

UNITED STATES PATENTS

| | | |
|---|---|---|
| 2,438,078 | Sutphen | Mar. 16, 1948 |
| 2,770,466 | Pearson | Nov. 13, 1956 |
| 2,784,005 | Abgarian | Mar. 5, 1957 |
| 2,791,436 | Wuerthner | May 7, 1957 |

FOREIGN PATENTS

| | | |
|---|---|---|
| 679,485 | Great Britain | Sept. 17, 1952 |